(12) United States Patent
Gavlik et al.

(10) Patent No.: US 7,194,502 B1
(45) Date of Patent: Mar. 20, 2007

(54) NETWORK INTERFACE CARD USING PHYSICAL LAYER MICROCONTROLLER AND METHOD OF OPERATION

(75) Inventors: John E. Gavlik, Oxnard, CA (US); Matthew J. Webb, Woodland Hills, CA (US); Ted Chang, Oak Park, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1077 days.

(21) Appl. No.: 09/713,389

(22) Filed: Nov. 15, 2000

(51) Int. Cl.
*G06F 15/16* (2006.01)
*G06F 9/44* (2006.01)
*G06F 9/445* (2006.01)

(52) U.S. Cl. .................... 709/200; 717/171; 717/176; 719/319; 719/327

(58) Field of Classification Search ................ 709/220, 709/222–224, 231, 250
See application file for complete search history.

(56) References Cited

U.S. PATENT DOCUMENTS

| | | | | |
|---|---|---|---|---|
| 5,506,790 A | * | 4/1996 | Nguyen ..................... | 700/286 |
| 5,651,059 A | * | 7/1997 | Morgan et al. .......... | 379/201.05 |
| 5,664,191 A | * | 9/1997 | Davidson et al. .......... | 718/100 |
| 5,781,776 A | * | 7/1998 | Johnston et al. ............ | 717/130 |
| 5,856,975 A | * | 1/1999 | Rostoker et al. ....... | 370/395.64 |
| 5,901,225 A | | 5/1999 | Ireton et al. | |
| 5,949,251 A | | 9/1999 | Chambers | |
| 6,009,274 A | * | 12/1999 | Fletcher et al. ............. | 717/173 |
| 6,014,740 A | * | 1/2000 | Shearer, Jr. ................. | 712/233 |
| 6,158,018 A | * | 12/2000 | Bernasconi et al. ........... | 714/8 |
| 6,247,175 B1 | * | 6/2001 | Ledford et al. ............. | 717/157 |
| 6,260,157 B1 | * | 7/2001 | Schurecht et al. ............. | 714/8 |
| 6,286,070 B1 | * | 9/2001 | Ohara ........................ | 710/113 |
| 6,314,525 B1 | * | 11/2001 | Mahalingham et al. ........ | 714/4 |
| 6,381,218 B1 | * | 4/2002 | McIntyre et al. ........... | 370/245 |
| 6,523,083 B1 | * | 2/2003 | Lin et al. .................... | 711/103 |
| 6,535,924 B1 | * | 3/2003 | Kwok et al. ................. | 709/242 |
| 6,628,999 B1 | * | 9/2003 | Klaas et al. .................. | 700/94 |
| 6,640,254 B1 | * | 10/2003 | Tanaka et al. .............. | 709/249 |
| 6,745,325 B1 | * | 6/2004 | Gavlik ....................... | 713/100 |
| 6,785,817 B2 | * | 8/2004 | Bacon et al. ............... | 713/189 |
| 6,859,825 B1 | * | 2/2005 | Williams .................... | 709/220 |

\* cited by examiner

*Primary Examiner*—Ario Etienne
*Assistant Examiner*—Hussein El-chanti

(57) ABSTRACT

There is disclosed an apparatus for controlling a physical layer interface of a network interface card. The apparatus comprises: 1) a read only memory (ROM) for storing an embedded control program; 2) a random access memory for storing a downloadable software control program; and 3) a microcontroller for controlling the physical layer interface, wherein the microcontroller in a first operating mode executes the embedded control program to thereby control the physical layer interface, and wherein the microcontroller in a second operating mode downloads the downloadable software control program from an external processing system and executes the software control program in place of the embedded control program to thereby control the physical layer interface.

23 Claims, 8 Drawing Sheets

NETWORK INTERFACE CARD USING PHYSICAL LAYER MICROCONTROLLER AND METHOD OF OPERATION

CROSS-REFERENCE TO RELATED APPLICATIONS

The present invention is related to that disclosed in U.S. patent application Ser. No. 09/713,643, entitled "MULTI-TASKING MICROCONTROLLER FOR CONTROLLING THE PHYSICAL LAYER OF A NETWORK INTERFACE CARD AND METHOD OF OPERATION" and filed concurrently herewith. The above application is commonly assigned to the assignee of the present invention. The disclosure of this related patent application is hereby incorporated by reference into the present disclosure as if fully set forth herein.

TECHNICAL FIELD OF THE INVENTION

The present invention is generally directed to network interface cards and, more specifically, to a microcontroller architecture that controls the physical layer of a network interface card.

BACKGROUND OF THE INVENTION

The demand for high-performance computers and communication devices requires that state-of-the-art networks and network interface devices operate at comparable high-performance levels. The necessary high-performance is provided by network interface cards (NIC) that operate at ever increasing speeds. These network interface cards (NIC) are used in a wide variety of devices, including personal computers, switches, routers, hubs, bridges, and the like. Network interface cards operating at 10 Mbps (i.e., 10BaseT) over Category-3 (CAT3) wires and network cards operating at 100 Mbps (i.e., 100BaseT) over Category-5 (CAT5) are in common use in Ethernet local area network (LAN) environments. Additionally, network interface cards that operate at 1 Gbps (i.e., 1000BaseT) are now coming into use in Gigabit Ethernet LANs.

To achieve the desired high-speed performance, it is essential that the monitoring and control functions of network interface cards operate as real-time functions. Conventional network interface cards obtain real-time performance using hard-wired state machines to control and monitor the internal operations of the physical layer of the network interface cards. In effect, each individual function of the physical layer requires its own state machine. This allows many functions to operate in parallel at very high speed.

However, the state machine approach has significant drawbacks. If a bug is found in a network card, if an existing function is to be modified, or if a new function is to be added, a new state machine must be designed or an existing state machine must be modified. Thus, a network interface card with hardwired state machine cannot be upgraded or patched and must be replaced. Some network card manufacturers attempt to overcome these drawbacks by using state machines that are at least partially implemented using PAL and PLA circuits. However, the degree to which a PAL or PLA circuit can be reprogrammed or upgraded is relatively limited. Moreover, many manufacturers use dedicated pins to communicate with and reprogram or upgrade the physical layer circuitry in their network interface cards. However, many network interfaces have only a limited number of I/O pins. Dedicating pins for reprogramming or upgrading purposes in these circumstances limits the versatility of a network interface card.

There is therefore a need in the art for improved network interface cards that may be easily upgraded or modified. In particular, there is a need for network interface card that may be upgraded or modified without using dedicated interface pins to download software patches or reprogram state machines in the network cards. More particularly, there is a need for network interface cards in which the functions of the physical layer circuitry can be monitored and controlled in real time without using hard-wired state machines. There is a still further need for network interface cards in which the physical layer may be easily reprogrammed or upgraded without using PAL or PLA circuits to control state machines.

SUMMARY OF THE INVENTION

To address the above-discussed deficiencies of the prior art, it is a primary object of the present invention to provide an apparatus for updating, correcting and enhancing the operation of a physical layer interface of a network interface card. According to an advantageous embodiment of the present invention, the apparatus comprises: 1) a read only memory (ROM) capable of storing an embedded control program; 2) a random access memory capable of storing a downloadable software control program; and 3) a microcontroller capable of controlling the physical layer interface, wherein the microcontroller in a first operating mode executes the embedded control program to thereby control the physical layer interface, and wherein the microcontroller in a second operating mode is capable of downloading the downloadable software control program from an external processing system and executing the software control program in place of the embedded control program to thereby control the physical layer interface.

According to one embodiment of the present invention, the ROM is an internal ROM in the microcontroller.

According to another embodiment of the present invention, the RAM is an internal RAM in the microcontroller.

According to still another embodiment of the present invention, the ROM is an external ROM coupled to the microcontroller.

According to yet another embodiment of the present invention, the RAM is an external RAM coupled to the microcontroller.

According to a further embodiment of the present invention, the microcontroller downloads the downloadable software control program from the external processing system via a media independent clock (MDC) signal line and a media independent input/output (MDIO) signal line.

According to a still further embodiment of the present invention, the microcontroller downloads the downloadable software control program via a medium access control (MAC) layer interface coupling the external processing system and the physical layer interface.

According to a yet further embodiment of the present invention, the microcontroller further comprises a plurality of control registers capable of controlling the first and second operating modes, wherein the microcontroller switches from the first operating mode to the second operating mode when the external processing system stores a jump address in one particular register in a first one of the plurality of control registers.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged network interface device.

Figure 1:
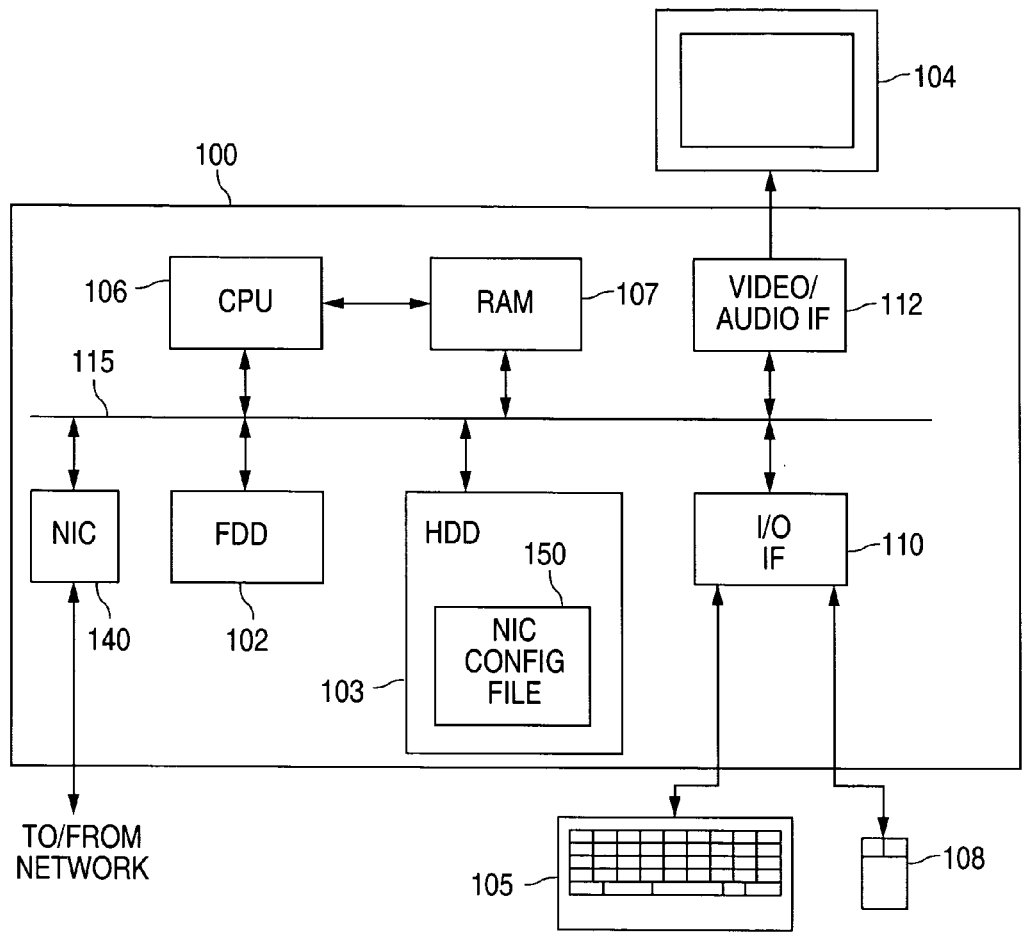
FIG. 1 illustrates an exemplary processing system, namely a personal computer (PC), containing a network interface card (NIC) that incorporates a microcontroller in the physical layer hardware according to the principles of the present invention.

FIG. 1 illustrates an exemplary processing system, namely personal computer (PC) 100, containing a network interface card that incorporates a microcontroller in the physical layer hardware in accordance with the principles of the present invention. Personal computer 100 comprises removable (i.e., floppy) disk drive (FDD) 102 and hard disk drive (HDD) 103, monitor 104, keyboard 105, processor (CPU) 106, main memory 107, a pointing device, such as mouse 108, and network interface card (NIC) 140. Monitor 104, keyboard 105, and mouse 108 may be replaced by, or combined with, other input/output (I/O) devices. Main memory 107 may comprise a volatile storage device, such as a dynamic random access memory (RAM). Processor 106 may comprise an on-board two level cache system, including a Level 1 (L1) cache and a Level 2 (L2) cache.

Keyboard 105 and mouse 108 are coupled to PC 100 via input/output (I/O) interface (IF) 110. Monitor 104 is coupled to PC 100 via video/audio interface (IF) 112. The internal components of PC 100, including floppy disk drive 102, hard disk drive 103, processor 106, main memory 107, I/O interface 110 and video/audio interface 112, are coupled to and communicate across communication bus 115. Communication bus 115 may represent one or more buses in PC 100, including a Peripheral Component Interconnect (PCI) bus. Removable disk drive 102 is capable of reading and writing to removable floppy diskettes. Hard disk drive 103 provides fast access for storage and retrieval of application programs and data.

NIC 140 allows PC 100 to communicate with an external data network, such as a local area network (LAN) in an office. NIC 140 may operate at different speeds according to conditions on the external network. For instance, NIC 140 may operate in 10BaseT, 100BaseT, and 1000BaseT modes in which NIC 140 transfers data at 10 Mbps, 100 Mbps, and 1000 Mbps, respectively. In an advantageous embodiment, hard disk drive 103 stores network interface card (NIC) configuration file 103. As will be explained below in greater detail, NIC configuration file 103 comprises a software control program that may be downloaded into a random access memory (RAM) in the physical layer of NIC 140. A microcontroller according to the principles of the present invention then executes the downloaded software control program in lieu of the embedded control program stored in read-only memory (ROM) that normally is executed by the microcontroller. In an advantageous embodiment of the present invention, whenever PC 100 is rebooted, software drivers executed by processor 106 retrieve and download the software control program in NIC configuration file 103 to the physical layer microcontroller of NIC 140.

Figure 2:
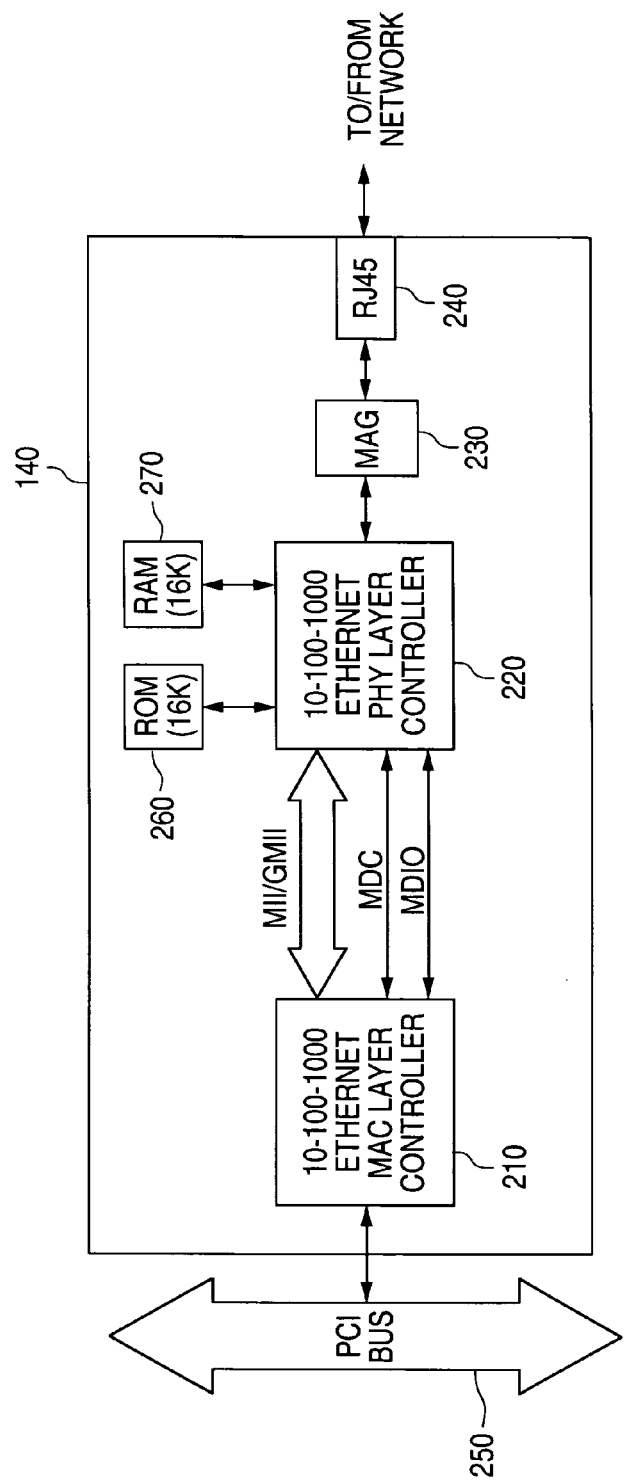
FIG. 2 illustrates an exemplary network interface card (NIC) in greater detail according to one embodiment of the present invention.

FIG. 2 illustrates exemplary network interface card (NIC) 140 in greater detail according to one embodiment of the present invention. Network interface card (NIC) 140 comprises 10-100-1000 Ethernet medium access control (MAC) layer controller 210 (hereafter, "MAC layer controller 210"), 10-100-1000 Ethernet physical layer controller 220 (hereafter, "physical layer controller 220"), magnetic (MAG) circuits 230, and connector 240, which may be, for example, an RJ45 connector. MAG circuits 230 comprises coupling transformer coils that transmit high bit-rate signals to, and receive high bit-rate signals from, for example, a Gigabit Ethernet LAN connected to RJ45 connector 240. Network interface card (NIC) 140 may also comprise optional external ROM 260 and optional external RAM 270. In the exemplary embodiment, ROM 260 and RAM 270 are both 16 kilobytes in size.

PC 100 communicates with and controls MAC layer controller 210 and physical layer controller 220 via PCI bus 250. The primary data interface between MAC layer controller 210 and physical layer controller 220 is the Media Independent Interface/Gigabit Media Independent Interface (MII/GMII). In an advantageous embodiment of the present invention, MAC layer controller 210 also communicates with physical layer controller 220 using the Management Data Clock (MDC) and Management Data Input/Output (MDIO) signal lines. The MDC and MDIO interface is a well-known, standardized interface used in most network interface cards to communicate between the MAC layer and the physical layer. In conventional network interface cards, MAC layer controller 210 uses the MDC/MDIO signal lines to access one or more of thirty-two (32) standardized registers (R0 through R31) in physical layer controller 220 for normal configuration and control functions, such as setting the bit rate (e.g., 10BaseT, 100BaseT, 1000BaseT), examining status registers, and the like.

In an exemplary embodiment of the present invention, MAC layer controller 210 may comprise a DP83820 chip from National Semiconductor Corporation and physical layer controller 220 may comprise a DP83861 chip from National Semiconductor Corporation. Those skilled in the art will understand, however, that equivalent MAC layer and physical layer chips from other manufacturers may readily be adopted for use in accordance with the principles of the present invention.

According to the principles of the present invention, PC 100 uses NIC driver software in hard disk drive 103 to download a new software control program from NIC configuration file 103 into physical layer controller 220 after PC 100 is booted up or reset. PC 100 uses MAC layer controller 210 and the MDC/MDIO signal lines to load the new software control program through selected ones of the R0–R31 registers and into random access memory (RAM) in physical layer controller 220. The new software control program is executed in place of the original embedded program in ROM in physical layer controller 220.

Figure 3:
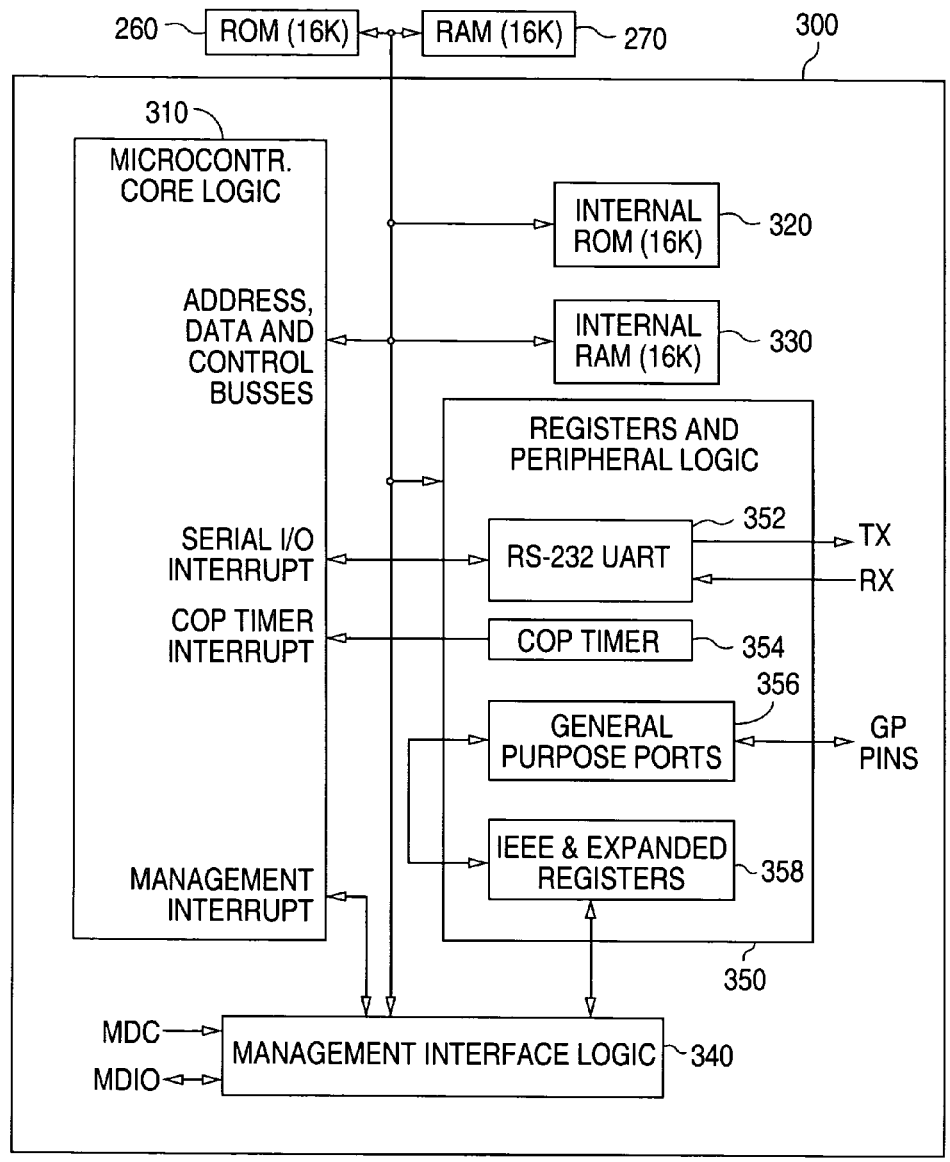
FIG. 3 illustrates an exemplary microcontroller in the physical layer controller of the network interface card according to one embodiment of the present invention.

FIG. 3 illustrates exemplary microcontroller 300 in physical layer controller 220 according to one embodiment of the present invention. Microcontroller 300 comprises microcontroller core logic 310, internal read-only memory (ROM) 320, internal random access memory (RAM) 330, management interface logic 340, and registers, peripheral logic 350, optional external ROM 260, and optional external RAM 270. Registers and peripheral logic 350 comprises RS-232 UART 352, computer operating properly (COP) timer 354, general purpose ports 356, and IEEE and expanded registers 358. Microcontroller core logic 310 is coupled to ROM 320, RAM 330, ROM 260, RAM 270, and registers and peripheral logic 350 by address, data and control busses. Microcontroller core logic 310 also receives interrupt signals from management interface logic 340 and registers and peripheral logic 350.

In an exemplary embodiment of the present invention, microcontroller 300 may comprise a variation of a standard Motorola™ MC68HC11 microcontroller. Those skilled in the art will understand, however, that equivalent microcontrollers from other manufacturers may readily be adopted for use in accordance with the principles of the present invention. Furthermore, in the exemplary embodiment, ROM 320 and RAM 330 are each 16 kilobytes (16K) in size and are internal to microcontroller 300. However, this is by way of illustration only. In alternate embodiments, additional ROM 260 and RAM 270 may be external devices coupled to microcontroller 300 and the size of ROM 320, ROM 260, RAM 330, or RAM 270 also may be smaller or larger than 16 kilobytes.

In an exemplary embodiment, microcontroller core logic 310 comprises a high performance, synthesizable 8-bit CPU core.

Microcontroller core logic 310 may implement, for example, the complete Motorola MC68HC11 instruction set and hardware architecture, including a sequencer, instruction decode unit, arithmetic unit and registers, as well as other support logic. Microcontroller core logic 310 may include an interrupt priority resolution system. In an exemplary embodiment, microcontroller 300 is driven by a 41.667 MHz clock signal.

In normal operating modes, microcontroller 300 uses an internal embedded program (i.e., firmware) in ROM 320 to control 10Base-T, 100Base-T and 1000Base-T physical layer functions, as well as RS-232 and management communications with PC 100 and the external network. The ROM 320 firmware may perform the following major functions:

Power-On Initialization
Start Up Configuration
Main Loop Control
Test Mode Control
Loopback Control
Auto Negotiation
10/100/1000 Base PHY-Control
1000 Base Link Monitor
RS-232 Serial Communications
Management Communications
LED Illumination Control
PATCH Routines Normally, program variables, pointers, multitasking vectors and the stack reside in the 16 Kbytes of RAM 320. According to the principles of the present invention, patches, upgrades and enhancements to the software control program may be downloaded as software (as opposed to firmware) that is stored in RAM 320 through management interface logic 340. The downloaded software code also permits the user to conduct extensive testing and debugging using the register interface of microcontroller 300.

RS-232 UART 352 forms a serial I/O (SIO) hardware interface between microcontroller 300 and PC 100. RS-232 UART 352 logic has two functional interfaces: a 2-wire link (RX and TX) to external host PC 100 and a 4 byte-wide data paths to microcontroller core logic 310. The TX and RX signals form a conventional RS-232 asynchronous communication link. Serial data can be transferred to and from PC 100 in full-duplex mode at one of four standard baud rates (115,200, 57,600, 38,400 and 19,200). Each serial data word is composed of a start bit, 8 data bits and one stop bit. Since this is a universally accepted asynchronous serial data format, it ensures that any terminal program resident on PC 100 can transmit and receive serial data to and from RS-232 UART 352 at the standard baud rates.

Computer operating properly (COP) timer 354 has two basic functions: 1) to issue an interrupt if, and when, it is not properly serviced by firmware; and 2) to act as a general-purpose event timer for any firmware or software routine. At the core of COP timer 354 is a 26-bit free-running binary up counter that is incremented on each positive-going edge of the 41.67 MHz microcontroller clock. At a clock rate of 41.67 MHz, 26 bits are necessary due to the fact that microcontroller 300 may time events over 1.5 seconds.

The primary function of COP timer 354 is to indirectly detect software errors by timing out. Therefore, if the firmware and/or software are functioning correctly, COP timer 354 is periodically reset thus keeping it from timing out. Resetting COP timer 354 is accomplished by writing a Logic 1 to bit 0 of a COP control register. The Logic 1 write to this register is self clearing and COP timer 354 resumes counting from zero on the next positive-going edge of the 41.67 MHz microcontroller clock.

If COP timer 354 does time out, it is an indication that the firmware or software is no longer being executed in the intended manner. If a time-out occurs, COP timer 354 issues a non-maskable interrupt to microcontroller core logic 310 that resets the microcontroller firmware code back to a power-on reset condition. In addition to its primary watch-dog function, COP timer 354 may also be used as a general-purpose event timer. Since COP timer 354 is 26 bits in length and increments on each positive-going edge of the 41.67 MHz clock, microcontroller 300 can time events as long as 1.6 seconds.

IEEE and expanded registers 358 allow PC 100 to access the internal workings of microcontroller 300. In an exemplary embodiment, IEEE and expanded registers 358 are organized as 256 register files (RF0 through RF255) with each register file consisting of 64 bytes. Although all 256 register files may not used, unused registers allow future functions to be added to the operation of microcontroller 300. Most individual registers exist in internal RAM with the exception of certain hardware-based registers normally located in RF0 through RF3.

Management interface logic 340 communicates with PCI bus 250 or PC 100 via the serial bit stream MDIO and the clock MDC with a specified frame structure and protocol as defined below:

| Frame Unit | Format | Bits | Driver | Definition |
|---|---|---|---|---|
| Preamble | 111 . . . 1 | 32 | STA | A Preamble may be sent at the beginning of each transaction, consisting of 32 contiguous logic ones; this is optional |
| Start of Frame | 01 | 2 | STA | A '01' delimiter initiates the transaction |
| Operation Code | CC | 2 | STA | Read (10) or Write (01) |
| PHY Address | AAAAA | 5 | STA | A 5-bit PHY address with MSB first |
| Register Address | RRRRR | 5 | STA | A 5-bit register address with MSB first |
| Turn Around | NN | 2 | STA | A 2-bit turnaround time to avoid contention during Reads. Read (1Z) or Write (01) |
| Data | DDD . . . D | 16 | STA/PHY | 16-bits of data (MSB first) driven by the PHY on Read transactions or the STA on Write transactions |
| Idle | ZZZ . . . Z | >=0 | STA | The idle condition is a high-impedance state. The PHY pulls-up the MDIO line to a logic one. No Idles are actually required |

Using the above protocol, data can be read from or written into the registers of microcontroller 300 and RAM 330.

In conventional network interface cards, the MDC/MDIO interface is intended to access only thirty-two, 16-bit registers in register file 0 (RF0) of IEEE and expanded registers 358. However, the present invention expands the use of this interface to incorporate reading and writing the entire 64K-memory space of microcontroller 300 via a direct memory access (DMA) hardware mechanism built into management interface logic 340. This expanded feature permits downloading new multi-tasking firmware into RAM 330 for the purpose of bug fixing, adding enhancements and internal diagnostics.

An expanded management interface according to the principles of the present invention can be viewed as having two modes of operation—base mode and expanded mode. Base mode management access can be described as a 16-bit read or write access to any register from register 0 (R0) to register 31 (R31) in the RF0 (base) register space. Expanded mode management accesses uses four (4) unused base mode registers as portals to the entire 64 Kbyte register and memory space of microcontroller 300.

| Expanded mode management access uses the following registers: | | | |
|---|---|---|---|
| 1) | RF0.R22 | 0x16 | Mode_Port |
| 2) | RF0.R29 | 0x1D | Data_Port |
| 3) | RF0.R30 | 0x1E | Addr_Port |
| 4) | RF0.R31 | 0x1F | JMP_JSR_Port | and operates in the following four modes:

Mode 1 (8-bit access):
  1 First write to the Addr_Port to setup the 16-bit address pointer.
  2a For one or more Read cycles:
    i) Read the Data_Port.
    ii) The 8-bit data pointed to by the Addr_Port is placed in the LSB of the frame.
    iii) Addr_Port <=Addr_Port+1
  2b For one or more Write cycles:
    i) Write the Data_Port.
    ii) The 8-bit data in the LSB of the frame is written at the Addr_Port.
    iii) Addr_Port <=Addr_Port+1
  3 Repeat 2a or 2b for more data transfers.

Mode 2 (16-bit access):
  1 First write to the Addr_Port to setup the 16-bit address pointer.
  2a For one or more Read cycles:
    i) Read the Data_Port
    ii) The 16-bit data pointed to by the Addr_Port is placed in the MSB & LSB of the frame.
    iii) Addr_Port <=Addr_Port+2
  2b For one or more Write cycles:
    i) Write the Data_Port
    ii) The 16-bit data in the MSB and LSB of the frame is written at the Addr_Port.
    iii) Addr_Port <=Addr_Port+2
  3 Repeat 2a or 2b for more data transfers.

Mode 3 (addr/data-bundled write-only access):
  1 i) First write to the Addr_Port to setup the MSB of the 16-bit address pointer (LSB is ignored).

2 ii) Write to Data_Port.
  iii) The MSB of the frame contains the LSB of the address pointer.
  iv) The LSB of the frame contains the data to be written.
3 Repeat 2 for more writes.

Mode 4 (JMP or JSR and execute):
 1 Write a 16-bit address to the JMP_JSR_Port.
 2 Program execution is immediately transferred to the previously downloaded code beginning at the JMP_JSR_Port address.

Register RF0.R22 controls the selection of modes 1, 2 and 3 above. Following a hard reset, mode 3 is the default mode. Mode 4 is entered by directly writing a 16-bit address to the JMP_JSR_Port.

Figure 4:
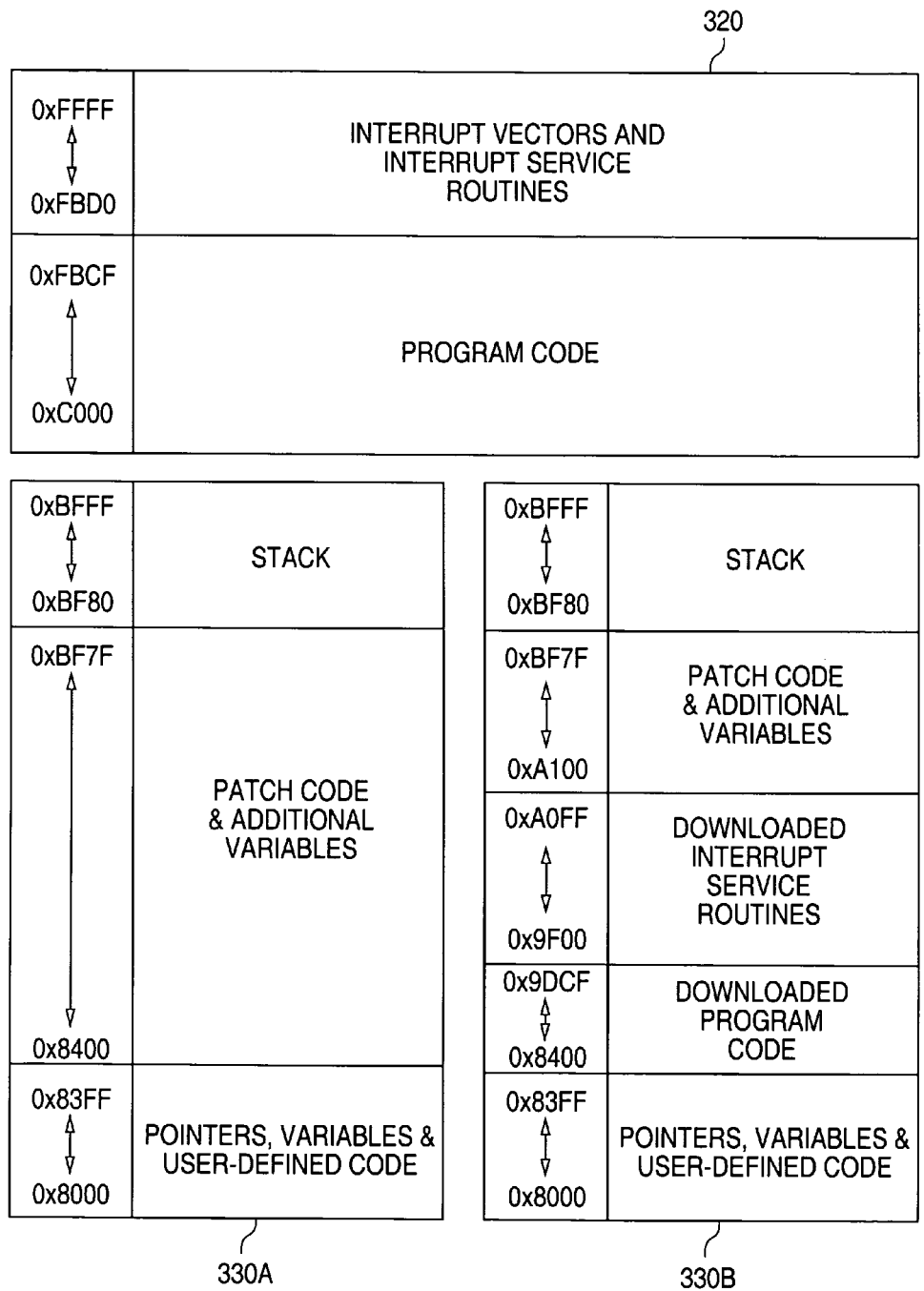
FIG. 4 is an exemplary memory map of the ROM and the RAM in the exemplary microcontroller according to the principles of the present invention.

FIG. 4 is an exemplary memory map of ROM 320 and RAM 330 according to the principles of the present invention. RAM 330A illustrates the typical contents of RAM 330 if a software patch or upgraded or enhanced software control program is not downloaded into RAM 330. RAM 330B illustrates the typical contents of RAM 330 if a software patch or upgraded or enhanced software control program is downloaded into RAM 330.

In the exemplary embodiment, ROM 320 stores program code in the address space from 0xC000 to 0xFBCF. ROM 320 stores interrupt vectors and interrupt service routines in the address space from 0xFBD0 to 0xFFFF. If code is running in ROM 320, RAM 330A stores pointers, variable and user-defined code used by the embedded program in ROM 320 in the address space from 0x8000 to 0x83FF. RAM 330A may also store patch code and additional variables in the address space from 0x8400 to 0xBF7F. The address space from 0xBF80 to 0xBFFF holds the stack used by the embedded program in ROM 320.

However, if an upgrade or an enhancement to the software control program is downloaded to RAM 330, the program code in ROM 320 will run until branching to the address in RAM 330B specified by JMP_JSR_Port in register RF0.R31. RAM 330B stores pointers, variable and user-defined code used by the downloaded software program code in RAM 330 in the address space from 0x8000 to 0x83FF. The software program itself is stored in RAM 330B in the address space from 0x8400 to 0x9DCF. RAM 330B stores interrupt service routines in the address space from 0x9F00 to 0xAOFF. RAM 330B stores patch code and additional variables in the address space from 0xA100 to 0xBF7F. The address space from 0xBF80 to 0xBFFF holds the stack used by the downloaded software program in RAM 330B.

Figure 5:
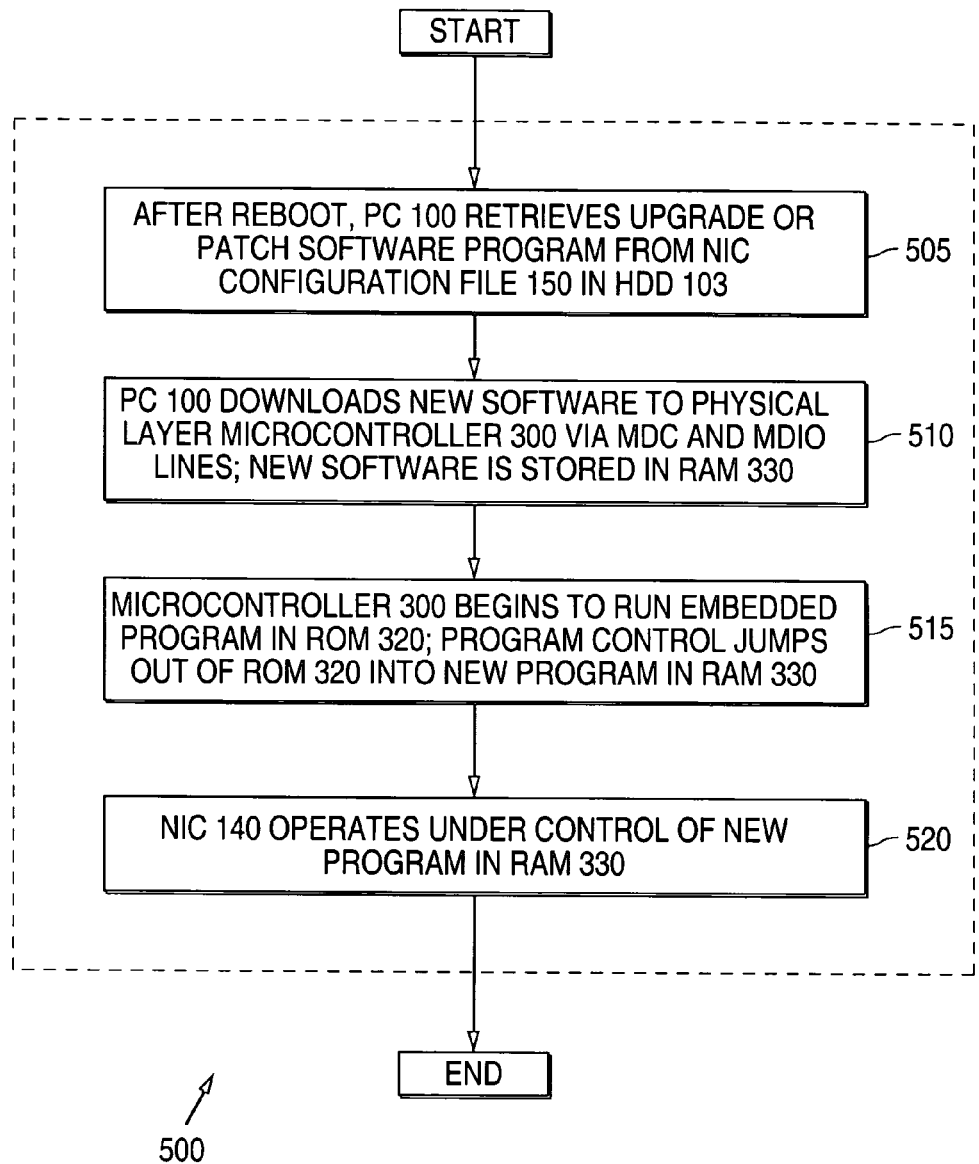
FIG. 5 is a flow diagram illustrating the operation of the exemplary network interface card according to one embodiment of the present invention.

FIG. 5 depicts flow diagram 500, which illustrates the operation of exemplary network interface card 140 according to one embodiment of the present invention. After a reboot or initial start up of PC 100, PC 100 executes software drivers that retrieve an upgraded or enhanced software control program, or error corrections for the software control program from NIC configuration file 150 in hard disk drive 103 (process step 505). Next, PC 100 downloads the new software control program to microcontroller 300 in the physical layer of NIC 140 using the standard MDC and MDIO signal lines. The new software control program is stored in RAM 330 (process step 510).

Microcontroller 300 then begins to run the embedded program in ROM 320. However, when PC 100 writes a 16-bit value to the JMP_JSR_Port RAM address in RF0.R31, the embedded program immediately jumps to the RAM address specified by JMP_JSR_Port. Thereafter, program control is transferred to the downloaded software control program in RAM 330 beginning at the JMP_JSR_Port address (process step 515). At this point, NIC 140 begins to operate under the control of the new software control program (process step 520).

As mentioned previously, manufacturers of conventional network interface cards traditionally rely on state machines to control the functions of the physical layer of the NIC. One of the overriding reasons for this is the ability of individual state machines to execute in parallel. Microcontrollers have not been used in the prior art network interface cards because of the sequential nature of microcontrollers.

In considering the incorporation of microcontroller 300 in the physical layer of NIC 140, it is equally necessary to consider a non-conventional (i.e., non-sequential) embedded control program (or downloaded software control program) to control the operations of microcontroller 300. Conventional (sequential) control programs are far too slow for monitoring and controlling the real-time functions of NIC 140. It is therefore necessary to incorporate a multi-tasking capability that can service the functions of microcontroller 300 in a real-time manner.

The ability to download an updated multi-tasking software control program into RAM 330 permits correction and optimization of functions without having to resort to re-fabrication every time a change or enhancement is needed or desired. The ability to multi-task the embedded control program or the software control program using an off-the-shelf microcontroller core is key to cost-effectively controlling the real-time operation of NIC 140. Furthermore, programming a standard microcontroller using an industry standard programming language and compiler is far easier to accomplish and test as compared with designing, simulating and testing equivalent hardware state machines.

Figure 6:
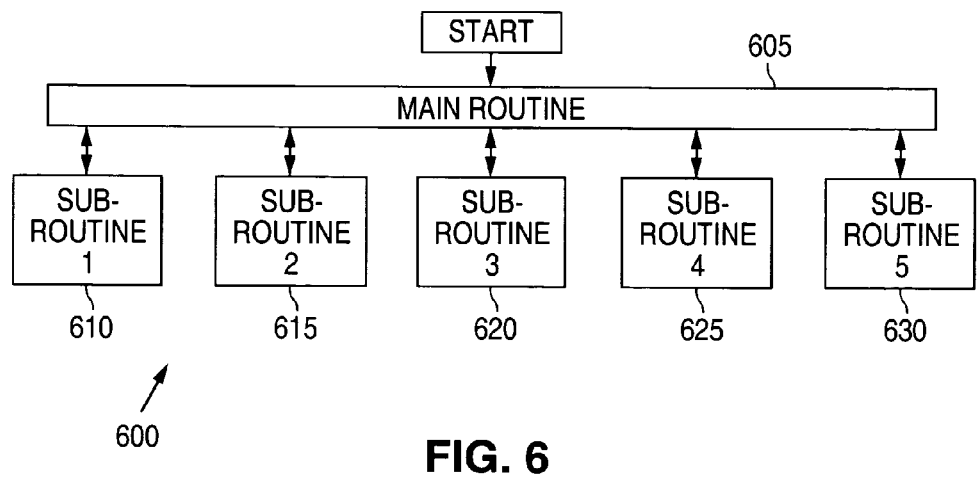
FIG. 6 is a flow diagram illustrating the hierarchy of multitasking routines in the control program that operates the exemplary network interface card according to one embodiment of the present invention.

FIG. 6 depicts flow diagram 600, which illustrates the hierarchy of multitasking routines in the control program that operates exemplary network interface card 140 according to one embodiment of the present invention. Multitasking may be performed by the original embedded control program in ROM 320 or by the new downloaded software control program in RAM 330, or both. The majority of the physical layer operations in NIC 140 may be monitored and controlled by the embedded control program, which resides in 16K of internal ROM 320. Additionally, a downloaded software control program in internal or external RAM, or both, may run independently, or together with, the ROM-based embedded control program. PC 100 may download a software control program through management interface logic 340. A downloaded software control program is normally used for testing, debugging, data logging, bug fixing and adding enhancements.

Since microcontroller 300 is essentially a sequential processor, the present invention uses a method of multi-tasking to accommodate servicing the multiple routines illustrated in FIG. 6. Microcontroller 300 executes main routine 605, which may may branch to any one of subroutines 610, 615, 620, 625, and 630, which are arbitrarily labeled Subroutine 1, Subroutine 2, Subroutine 3, Subroutine 4, and Subroutine 5, respectively. Main routine 605 operates as a top-level executive routine. Main routine 605 calls each of the major subroutines, including subroutines 610, 615, 620, 625, and 630, in order to give each subroutine an opportunity to complete a portion of its tasks.

At the most basic level, all subroutines in an embedded control program or in a downloaded software control program share the same sequential flow, which can generally be described as a sequence of instructions that perform some process followed by a decision block, followed by additional processes and decisions. Without multitasking, normal program flow in any given subroutine may be suspended in a loop in a decision block for an indefinite period of time. An example of this type of event is waiting for a timer to expire or waiting for a particular signal to go true or false. In either case, other subroutines cannot be serviced during the stall period, unless some form of multitasking is implemented.

Multitasking in microcontroller 300 is done by using a series of pointers called multitasking vectors (or MTVs) which reside in RAM 330. Each one of subroutines 610, 615, 620, 625, and 630 has its own MTV and at Power ON, the control program initializes the MTV of each subroutine to point to the beginning of that subroutine. As each subroutine executes, it updates its own MTV. When the subroutine comes to a decision point that cannot be immediately satisfied (such as waiting for a timer to expire), the subroutine leaves its MTV pointing to the beginning of the decision loop and returns to the calling routine (e.g., main routine 605). The next subroutine in sequence is then serviced. The next time the original subroutine is serviced, it begins processing at the last MTV address position.

Figure 7:
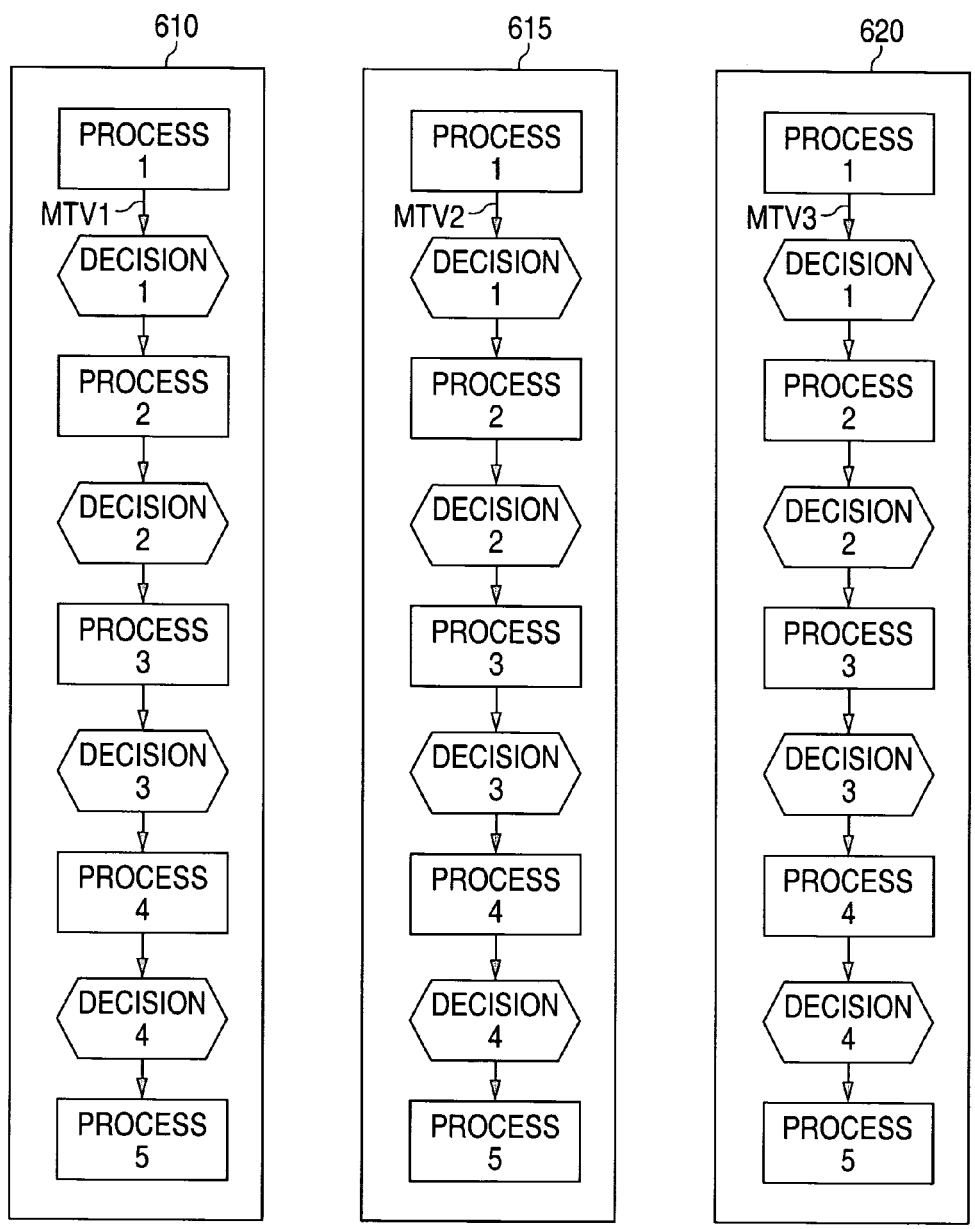
FIGS. 7–9 illustrate multitasking program flow in three exemplary subroutines according to one embodiment of the present invention.
Figure 8:
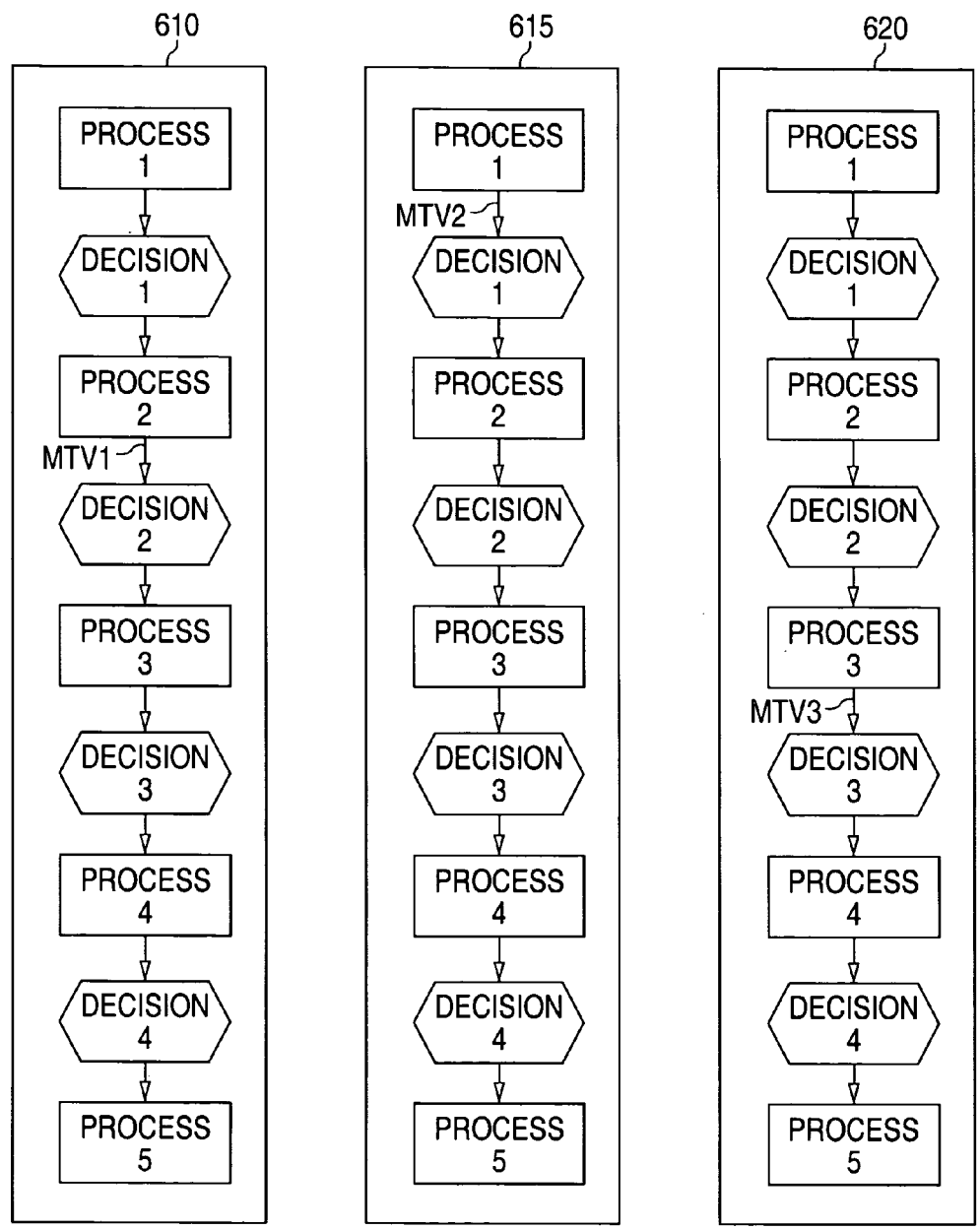
Figure 9:
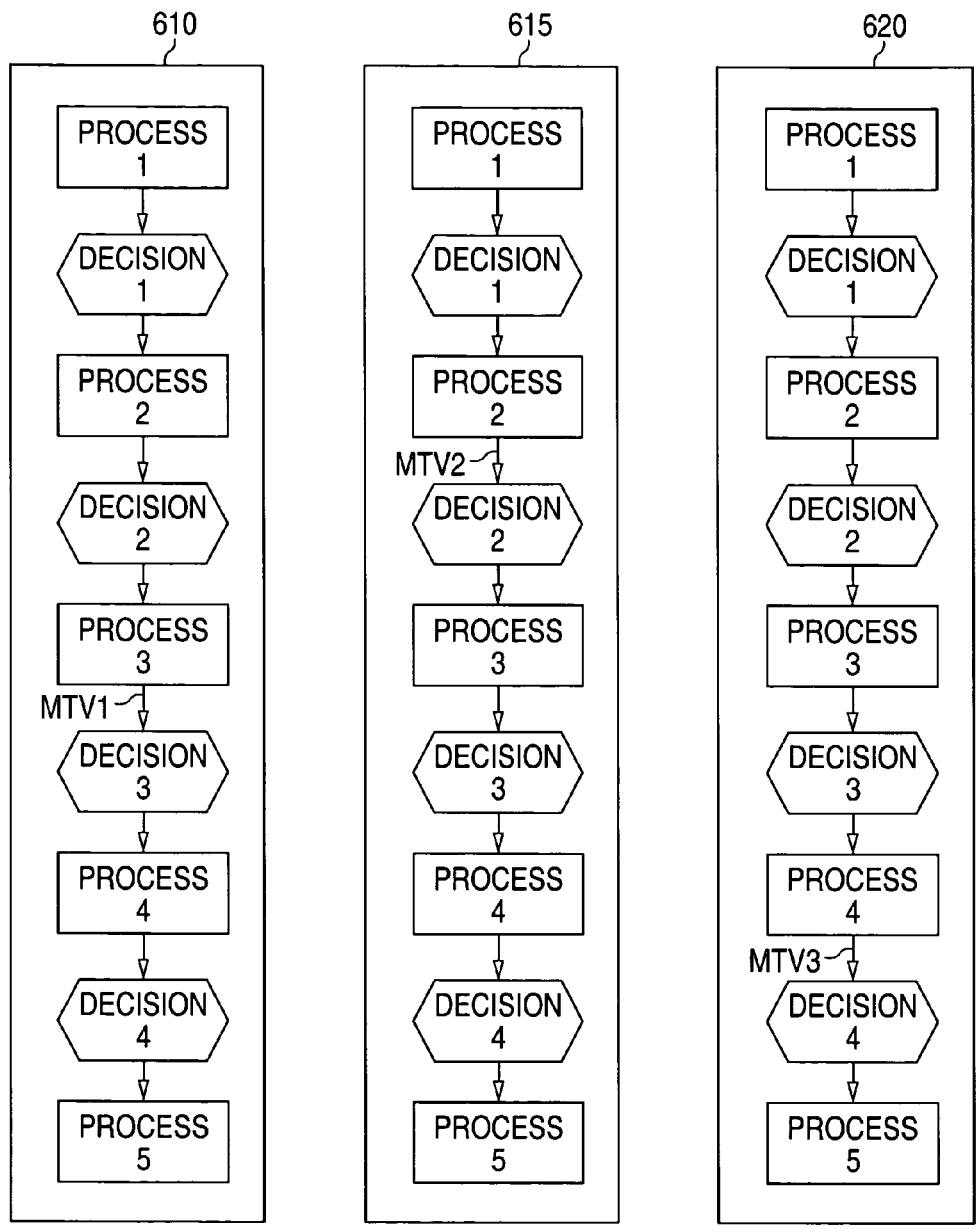

FIGS. 7–9 illustrate multitasking program flow in three exemplary subroutines, namely subroutines 610, 615, and 620 (i.e., Subroutines 1, 2 and 3), according to one embodiment of the present invention. Subroutine 1 comprises a sequence of processes (Processes 1–5) separated by decision blocks (Decisions 1–4). Similarly, Subroutine 2 and Subroutine 3 also comprise a sequence of processes (Processes 1–5) separated by decision blocks (Decisions 1–4).

Microcontroller 300 begins processing Subroutine 1 by first completing Process 1. When Process 1 is complete, Subroutine 1 moves its Multi-Tasking Vector, MTV1, to the beginning of Decision 1. Assuming that Decision 1 cannot be immediately completed, Subroutine 1 then leaves MTV1 pointing to the beginning of Decision 1, and the control program begins processing Subroutine 2 starting from Process 1.

Process 1 in Subroutine 2 completes and the control program moves MTV2 to the beginning of Decision 1. Again, for purposes of example, Decision 1 cannot be completed immediately, so Subroutine 2 leaves MTV2 pointing to the beginning of Decision 1. The control program then begins processing Subroutine 3. Subroutine 3 executes Process 1 and encounters Decision 1, which cannot be immediately satisfied. This process continues until program control eventually comes back to Subroutines 1, 2 and 3.

Moving forward in time, FIG. 8 shows the positions of MTV1, MTV2 and MTV3 in their respective subroutines. As can be seen, Subroutine 1 has progressed to Decision 2, while Subroutine 2 is still waiting for Decision 1 to complete. Subroutine 3 has progressed to Decision 3. Again moving forward in time, FIG. 9 shows the positions of MTV1, MTV2 and MTV3 in their respective subroutines. Subroutine 1 has progressed to Decision 3, Subroutine 2 has progressed to Decision 2, and Subroutine 3 has progressed to Decision 4. Advantageously, microcontroller 300 spends very little time in each of Subroutines 1, 2 and 3 testing for a decision. Rather, microcontroller 300 rapidly moves from subroutine to subroutine, all the while maintaining the real-time integrity of each subroutine.

An important subset of multitasking subroutines are patch routines. According to an advantageous embodiment of the present invention, patch routines are the preferred way to download a customized software control program to modify the programmatic flow of the ROM-based embedded software control program. As the name implies, a patch routine allows the user to patch together or patch around portions of an existing embedded ROM control program. Patch routines can also stand alone as separate callable subroutines not related to any existing embedded control program function.

In an exemplary embodiment of the present invention, patch routines may be implemented using MTV patch flags. From either Power ON or a manual reset, microcontroller 300 clears to all zeroes 32 MTV patch flags, which are organized in four contiguous bytes in internal RAM 330. The MTV patch flags are the turn ON or Turn OFF mechanism for their related patch routines. That is, the user may download from 1 to 32 patch routines into internal or external RAM (e.g., RAM 330) and by setting or resetting any of the 32 MTV patch flags, activate or deactivate any of the related patch routines.

Provisions are made for each of the 32 patch routines to have a multitasking vector (MTV) exactly like a normal embedded control program subroutine. Each patch routine may or may not be called from main routine 605, depending on the state of its MTV patch flag. Patch routines are constructed exactly like any other multi-tasking control program routine, except that all patch routines are actually callable subroutines that have an RTS (Return From Subroutine) as the last instruction. In an exemplary embodiment of the present invention, patch routines may be created and assembled in 68HC11 assembly language and then downloaded into RAM 330 via management interface logic 340.

Although the present invention has been described in detail, those skilled in the art should understand that they can make various changes, substitutions and alterations herein without departing from the spirit and scope of the invention in its broadest form.

What is claimed is:

1. An apparatus for controlling a physical layer interface of a network interface card, said apparatus comprising:
   a read only memory (ROM) capable of storing an embedded control program;
   a random access memory capable of storing a downloadable software control program downloaded from an external processing system; and
   a microcontroller capable of controlling said physical layer interface, wherein said microcontroller in a first operating mode is capable of executing said embedded control program to thereby control said physical layer interface, and wherein said microcontroller in a second operating mode is capable of executing said downloadable software control program in place of said embedded control program to thereby control said physical layer interface;
   wherein said microcontroller comprises a plurality of control registers capable of controlling said first and second operating modes, wherein said microcontroller switches from said first operating mode to said second operating mode when said external processing system stores a jump address to said RAM in a first one of said plurality of control registers.

2. The apparatus as set forth in claim 1 wherein said ROM is an internal ROM in said microcontroller.

3. The apparatus as set forth in claim 1 wherein said RAM is an internal RAM in said microcontroller.

4. The apparatus as set forth in claim 1 wherein said ROM is an external ROM coupled to said microcontroller.

5. The apparatus as set forth in claim 1 wherein said RAM is an external RAM coupled to said microcontroller.

6. The apparatus as set forth in claim 1 wherein said microcontroller downloads said downloadable software control program from said external processing system via a media independent clock (MDC) signal line and a media independent input/output (MDIO) signal line.

7. The apparatus as set forth in claim 6 wherein said microcontroller downloads said downloadable software control program via a medium access control (MAC) layer interface coupling said external processing system and said physical layer interface.

8. The apparatus of claim 1, wherein the first control register comprises a last register in a first register file in the microcontroller.

9. The apparatus of claim 8, wherein the microcontroller includes 256 register files, each register file containing 32 16-bit registers.

10. A processing system comprising:
   a data processor;
   a hard disk drive capable of storing a network interface card (NIC) configuration file containing a downloadable software control program; and
   a network interface card for coupling said processing system to a data network, said network interface card comprising an apparatus for controlling a physical layer interface of said network interface card, said apparatus comprising:
      a read only memory (ROM) capable of storing an embedded control program;
      a random access memory capable of storing a downloadable software control program downloaded from an external processing system; and
      a microcontroller capable of controlling said physical layer interface, wherein said microcontroller in a first operating mode is capable of executing said embedded control program to thereby control said physical layer interface, and wherein said microcontroller in a second operating mode is capable of executing said downloadable software control program in place of said embedded control program to thereby control said physical layer interface;
      wherein said microcontroller comprises a plurality of control registers capable of controlling said first and second operating modes, wherein said microcontroller switches from said first operating mode to said second operating mode when said external processing system stores a jump address to said RAM in a first one of said plurality of control registers.

11. The processing system as set forth in claim 10 wherein said ROM is an internal ROM in said microcontroller.

12. The processing system as set forth in claim 10 wherein said RAM is an internal RAM in said microcontroller.

13. The processing system as set forth in claim 10 wherein said ROM is an external ROM coupled to said microcontroller.

14. The processing system as set forth in claim 10 wherein said RAM is an external RAM coupled to said microcontroller.

15. The processing system as set forth in claim 10 wherein said microcontroller downloads said downloadable software control program from said external processing system via a media independent clock (MDC) signal line and a media independent input/output (MDIO) signal line.

16. The processing system as set forth in claim 15 wherein said microcontroller downloads said downloadable software control program via a medium access control (MAC) layer interface coupling said external processing system and said physical layer interface.

17. For use in a network interface card having a physical layer interface controllable by a microcontroller embedded therein, a method of operating the microcontroller comprising the steps of:
   in a first operating mode, executing an embedded control program stored in a read only memory (ROM) coupled to the microcontroller to thereby control the physical layer interface;
   in a second operating mode, executing a software control program downloaded from an external processing system and stored in a random access memory (RAM) coupled to the microcontroller in place of the embedded control program to thereby control the physical layer interface; and
   switching from the first operating mode to the second operating mode when the external processing system stores a jump address to the RAM in a first one of a plurality of control registers in the microcontroller wherein the control registers are capable of controlling said first and second operating modes.

18. The method as set forth in claim 17 wherein the ROM is an internal ROM in the microcontroller.

19. The method as set forth in claim 17 wherein the RAM is an internal RAM in the microcontroller.

20. The method as set forth in claim 17 wherein the ROM is an external ROM coupled to the microcontroller.

21. The method as set forth in claim 17 wherein the RAM is an external RAM coupled to the microcontroller.

22. The method as set forth in claim 17 wherein the step of downloading comprises the step of downloading the software control program from the external processing system via a media independent clock (MDC) signal line and a media independent input/output (MDIO) signal line.

23. The method as set forth in claim 22 wherein the step of downloading comprises the step of downloading the software control program via a medium access control (MAC) layer interface coupling the external processing system and the physical layer interface.

* * * * *